Figure 1:
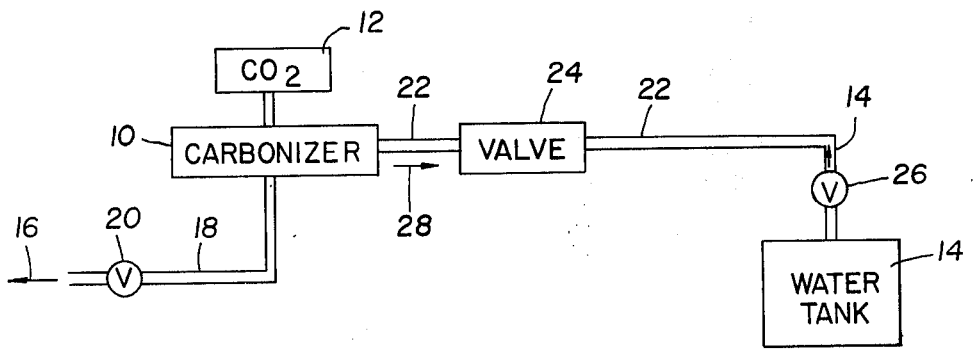

United States Patent [19]

Sealfon et al.

[11] 3,967,635
[45] July 6, 1976

[54] VALVE FOR CARBONATOR

[76] Inventors: Andrew I. Sealfon, 305 W. 13th St., New York, N.Y. 10014; Paul Rosenbaum, 84-57 Goldington Court, Rego Park, N.Y. 11374

[22] Filed: Nov. 7, 1974

[21] Appl. No.: 521,654

[52] U.S. Cl. .............................. 137/102; 137/512.2
[51] Int. Cl.² ................................................ F16K 45/00
[58] Field of Search ....................... 137/102, 512.2; 251/344

[56] References Cited
UNITED STATES PATENTS

| | | | |
|---|---|---|---|
| 1,726,102 | 8/1929 | Forman | 137/506 |
| 2,270,549 | 1/1942 | Orr | 137/102 |
| 2,610,859 | 9/1952 | Wilcox et al. | 137/102 |
| 3,034,527 | 5/1962 | Hennells | 137/102 |
| 3,246,663 | 4/1966 | Jokowchuk | 137/102 |
| 3,464,321 | 9/1969 | Piotrowski, Jr. | 137/102 X |
| 3,606,904 | 9/1971 | Taylor | 137/102 |

*Primary Examiner*—William R. Cline
*Attorney, Agent, or Firm*—Bauer, Amer & King

[57] ABSTRACT

A valve for a carbonator having an internal check valve movable between two operable positions depending upon whether the carbon dioxide or the pressure water has the greater pressure, (these being the ingredients of the carbonated fluid being sought). When the carbon dioxide positions the check valve, venting openings having an aligned relation cause harmless venting of the carbon dioxide to atmosphere, thereby obviating any possible contamination of the water source by the carbon dioxide. When the pressure water positions the check valve, a consequence of such movement is that a sealing ring occupies an interposed position between the venting openings to prevent any water leakage therethrough during this interval of operation.

1 Claim, 3 Drawing Figures

VALVE FOR CARBONATOR

The present invention relates generally to flow control valves, and more particularly to improvements for a valve controlling the mixing of carbon dioxide and water during the production of carbonated water.

During typical use of a carbonator which, in a well understood manner, results in the production of carbonated water by allowing the mixing of carbon dioxide and water, it is necessary, during intervals of non-flow of the water into the carbonator, to prevent back-up flow of the carbon dioxide into the water source, since this is likely to contaminate the water source. Flow control valves, as exemplified by that shown in U.S. Pat. No. 1,726,102, are effective in preventing water source contamination by using an internal plunger which undergoes opening movement relative to a venting opening preparatory to venting operation. The use of such plunger or similar member, however, which must assume an open or closed position relative to a venting opening, is unnecessarily complicated due not only to the movement involved, but also because the closed position of the plunger must be rendered leakproof.

Broadly, it is an object of the present invention to provide an improved carbonator valve overcoming the foregoing and other shortcomings of the prior art. Specifically, it is an object to incorporate a nominal sliding clearance about an internal valve member as part of the venting passage and to utilize, in a noteworthy advantageous manner, a sealing ring, such as is ordinarily used about a piston or the like, to selectively control flow through such sliding clearance depending on the position of such sealing ring.

An improved carbonator valve demonstrating objects and advantages of the present invention includes a piston-like operative member which houses a check valve and which is slidably disposed in the carbonator valve for sliding movement between a carbon dioxide pressure induced position of movement and a water-pressure induced position of movement. When the carbon dioxide positions the operative member, venting openings of the operative member and of the valve are in alignment to contribute to venting to atmosphere of the carbon dioxide. Movement of the operative member from said position of movement to its other position in response to an overbalance of water pressure, moves the venting openings out of alignment and, more particularly, results in the sealing ring occupying an interposed sealing position therebetween. This prevents leakage of pressure water through the carbon dioxide venting openings.

Figure 2:
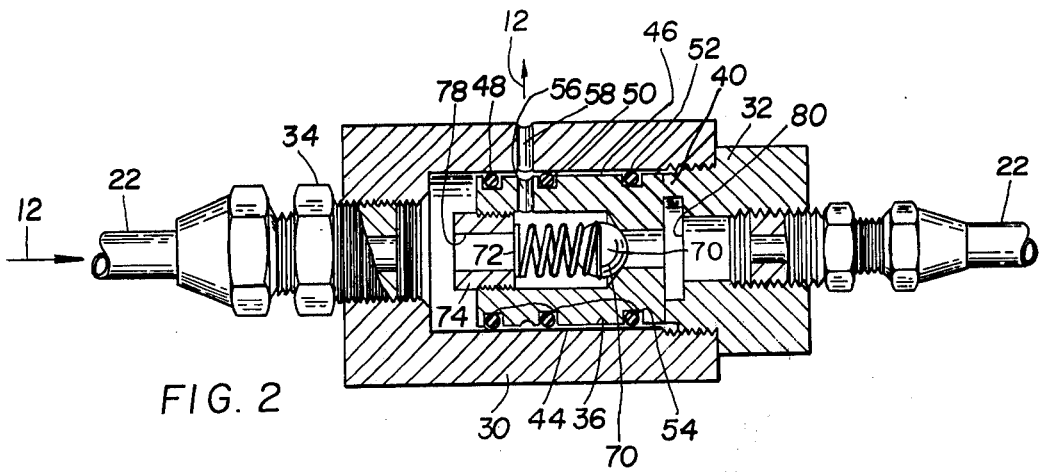
Figure 3:
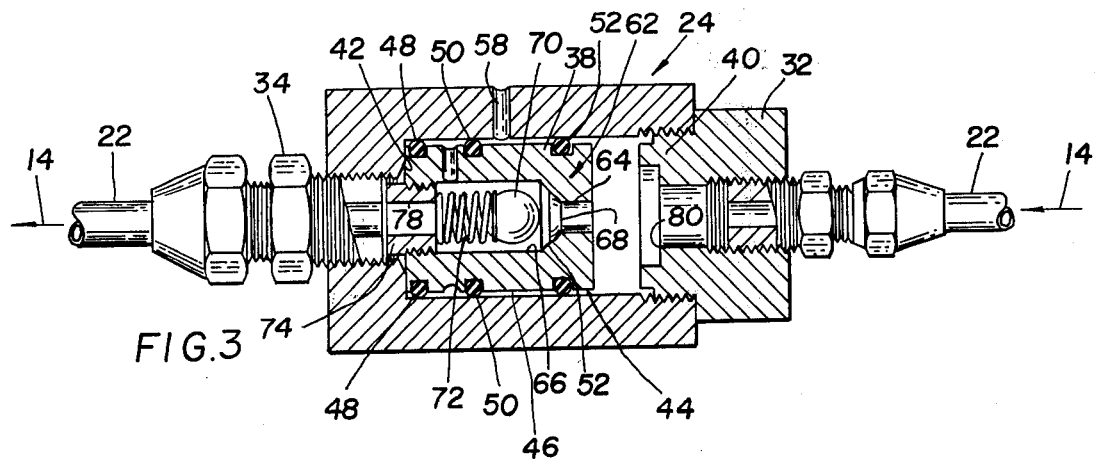

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a diagramatic view illustrating typical use of the valve hereof in conjunction with the operation of a carbonizer;

FIG. 2 is an isolated side elevational view of the valve, in an enlarged scale and in section, illustrating internal structural features thereof, and also illustrating an operative position of movement of a valve internal member during which carbon dioxide is vented through aligned venting openings to atmosphere; and FIG. 3 is a view similar to FIG. 2, but illustrating another operative position of the internal member in which pressurized water is flowing through the valve and there nevertheless is no leakage of such water through the previously noted venting openings.

Reference is now made to the drawings, and in particular to FIG. 1 in which there is shown a diagramatic illustration of a water-carbon dioxide mixing system for a carbonator 10. As generally understood, the function of this system is to feed into the carbonator 10 a prescribed amount of carbon dioxide from a suitable source 12, and also water from a suitable source 14. The water 14 and carbon dioxide 12 are mixed in a well understood manner in the carbonator 10 to form a carbonated fluid or soda 16, the exit flow of which is through conduit 18 and is controlled by exit valve 20. In the operation of the carbonator 10 and the system involving the same as depicted in FIG. 1, the water 14 is pumped to the carbonator 10 through a suitable conduit 22 and passes through the improved carbonator valve 24 of the present invention. As will be explained in greater detail subsequently, valve 24 does not interfere with the flow of the high pressure water 14 into the carbonator 10 and also is effective, when shutoff valve 26 is closed to temporarily discontinue the flow of pressure water 14 into the carbonator 10, in preventing the carbon dioxide, which is always under pressure, from flowing out of the carbonator 10 in the direction 28 past the valve 24 and thereby possibly contaminating the water source 14. Instead, valve 24, during this interval of operation, namely during non-flow of the pressure fluid or water 14, is effective in permitting the harmless venting of the carbon dioxide from the system to atmosphere. Additionally, in the event that the check valve 62 of valve 24 is not functioning properly, due to dirt on the seat thereof or other such reason, there will also be venting of the carbon dioxide rather than contamination of the water source.

Reference is now made to FIGS. 2 and 3, which illustrate details of construction and of the mode of operation of the valve 24 which provides the aforesaid selective venting of the carbon dioxide 12 (FIG. 2) and which does not adversely interfere with flow of the pressure water 14 into the carbonator 10 during mixing operation of the carbonator 10 (FIG. 3). Specifically, valve 24 includes an outer cylindrical body 30 which, at opposite ends, is appropriately machined to respectively threadably accommodate inlet and outlet members 32 and 34. In between the inlet 32 and outlet 34, the cylindrical body 30 bounds an internal chamber 36. Disposed for sliding movement within the chamber 36 is a cylindrically shaped, operable member 38 having a first position of movement, as illustrated in FIG. 2, in which it is seated against a ring 40 machined in an internal surface of the inlet 32, and a second position of movement, as illustrated in FIG. 3, in which the operable member 38 is seated against internal surface 42 of the body 30. The significance of these positions of movement will subsequently be readily apparent.

As is readily apparent from FIGS. 2, 3, member 38, which as already noted is preferrably cylindrical and therefore comparable in shape to the cylindrical chamber 36, will be understood to be of a diameter which results in a minimum sliding clearance 44 between its outer surface 46 and the surface of body 30 which bounds the chamber 36. As a consequence of the distance 44 between the member 38 and the body 30 being limited to this minimum extent (i.e. sliding clearance), such sliding clearance 44 is readily sealed against leakage by conventional sealing rings 48, 50 and 52, which are each sealingly disposed in circular grooves, individually and collectively designated 54. That is, an essential contribution of the invention hereof is to advantageously use the sliding clearance 44 which, for such purpose of permitting unimpeded sliding is of a minimum extent, also as a passage for selectively venting the carbon dioxide 12 when it is desired to do so. The small passage 44 is readily sealed against leakage by sealing ring 50 when it is necessary to prevent water leakage through the carbon dioxide venting openings.

The above can be more readily appreciated from a comparison of FIGS. 2 and 3. Specifically, as may be noted in the illustrated position of movement of member 38 in FIG. 2, a radially oriented venting opening 56 of the member 38 is in alignment with a similarly radially oriented venting opening 58 of the body 30, and this will be understood to contribute to venting of any carbon dioxide 12 from the valve 24 to atmosphere. It will be clearly understood that the reference to an aligned relation between the venting openings 56 and 58 does not require that these two openings be so arranged relative to each other that one is the continuation of the other. Rather, the referred to aligned relationship is intended to contemplate a general alignment in which the venting opening 58 and 56 lie generally in the same radial plane but may be circumferentially out of phase or out of direct alignment with each other. Stated another way, as illustrated in FIG. 2, venting opening 56 opens into a length portion of the sliding clearance 44 which exists between the sealing rings 48 and 50 and, in this connection, will be understood to be in aligned relation with the venting opening 58 whenever said sealing rings 48 and 50 are on opposite sides of the venting opening 58.

In the other position of movement of the member 38, as depicted in FIG. 3, the movement of member 38 to the left and into abutment against the surface 42, of necessity results in movement of the venting opening 56 out of its previously aligned relation with the venting opening 58. Specifically, as clearly illustrated in FIG. 3, the position of movement of the member 38 is such that sealing ring 50 occupies an interposed position between the two venting openings 56 and 58. As a consequence, not only is there no venting to atmosphere of any carbon dioxide 12, but also there is no leakage of the pressure fluid 14 from the valve 24 through the venting openings 56 and 58.

More particularly, the FIG. 3 operative position of the member 38 is that position in which flow of the pressure fluid 14 is permitted through the valve 24 so that such fluid can enter the carbonator 10 preparatory to being mixed with the carbon dioxide 12. To achieve this, member 38 is appropriately internally machined so as to house an internal check valve, generally designated 62. Although the construction and mode of operation of the check valve 62 is intended to be conventional and therefore does not form an essential part of the present invention, and therefore need not be described in great detail, for completeness' sake, it will be generally described. Specifically, check valve 62 includes an inlet opening 64, which opens into a slightly larger diameter flow passage 66. At the juncture of these openings, there is formed a conical seat 68 for the valve member or ball 70. A spring 72 is held by a retaining member 74 in an appropriate operative position within the flow passage 66 to normally bias ball 70 into its seated position, as depicted in FIG. 2, in which there is no flow of the pressure fluid 14 through the check valve 62. That is, there is no flow of the pressure fluid 14 through the flow passage 66, and also no flow of the carbon dioxide 12 in the reverse direction past the seated ball 70. Instead, any carbon dioxide backing 12 up through the valve 24 and through the central opening 78 into the flow passage 66 can only flow through the venting opening 56 into the clearance length portion 60 and from thence through the venting opening 58 to atmosphere.

The FIG. 3 operative position of the member 38 is produced when the line valve 26 is opened and the pressure of the flowing fluid 14 is effective, when flowing through the inlet 32 into the chamber 80 formed within the ring 40, in urging the member 38 through sliding movement into its FIG. 3 position of movement. Once member 38 assumes the FIG. 3 position of movement, as already noted, sealing ring 50 assumes an interposed position between the venting openings 56 and 58 and thus prevents any leakage of either the carbon dioxide or of the pressure fluid 14 from the valve 24. Moreover, the pressure of the fluid 14 is effective in lifting the ball 70 from its seat 68 and thus permitting the unimpeded flow of the pressure fluid 14 through passageway 66 and through the outlet 34 for flow into the carbonator 10. When the shut-off valve 26 is closed, or in some other way a minimum pressure condition is induced in the fluid 14, the operative member 38 is urged to the right, this time by the pressure of the carbon dioxide 12 which then exceeds that of the fluid 14, until member 38 achieves its position of movement depicted in FIG. 2. Simultaneously with this movement, the ball 70, which is no longer forced off of its seat 68 by the pressure fluid 14, is urged by the spring 72 into its seated position on the conical seat 68. Moreover, even if dirt or the like interferes with proper seating of the ball 70 in seal-tight relation against the seal 68, as already noted, there will be a harmless venting of the carbon dioxide 12 to atmosphere from the valve 24 which, in turn, obviates any likelihood that the carbon dioxide 12 will reach and thereby contaminate the water source 14.

A latitude of modification, change and substitution is intended in the foregoing disclosure, and in some instances some features of the invention will be employed without a corresponding use of other features. Accordingly, it is appropriated that the appended claims be construed broadly and in a manner consistent with the spirit and scope of the invention herein.

What is claimed is:

1. A valve for use in a carbonator to selectively permit the flow of water to a source of carbon dioxide, and during intervals of non-flow of said water, to minimize back-up of said carbon dioxide into said source of water, said valve comprising a valve body having at opposite ends a water inlet and a water outlet, said valve body having between said inlet and outlet a cylindrically shaped internal wall bounding a piston chamber of a prescribed diameter, a piston disposed for sliding movement in said chamber between first and second positions of movement respectively reflecting minimum and maximum pressures of said water and having a corresponding external shape and of a diameter size defining a minimum sliding clearance between said piston and said valve body internal chamber wall, an internal check valve including a valve seat and a ball valve in facing relation therewith in said piston between said water inlet and outlet, a cooperating pair of first and second passageways, said first venting passageway being formed in said piston in communication with, and oriented transversely of, said internal check valve, one end of said first venting passageway opening into said minimum sliding clearance between said piston and said valve body internal chamber wall and said other end of said first venting passageway opening into said internal check valve in the area thereof adjacent said ball valve when in said closed position in said valve seat, said second venting passageway being formed with a radial orientation in said valve body, said venting passageways being so located relative to each other as to have an aligned relation only in said first position of movement of said piston reflecting said minimum pressure condition of said water, at least one sealing ring being in circumferential position about said piston projecting through said minimum clearance provided for said sliding movement thereof into sealing contact against said valve body internal wall, said sealing ring being located between said second venting passageway and said valve seat of said check valve so that said sealing ring assumes an interposed position between said cooperating first and second venting passageways in said second position of movement of said piston and when said internal check valve is open preparatory to water flow therethrough to thereby minimize the leakage of said flowing water through said venting passageways, but when said check valve is closed and said water is not flowing therethrough should any carbon dioxide then flow into said valve through said water outlet said carbon dioxide is vented to atmosphere through said aligned venting passageways.

* * * * *